United States Patent
Manithara Vamanan et al.

(10) Patent No.: US 12,439,291 B2
(45) Date of Patent: Oct. 7, 2025

(54) QUALITY OF SERVICE FRAMEWORK ENHANCEMENTS FOR 5G SERVICE

(71) Applicant: Apple Inc., Cupertino, CA (US)

(72) Inventors: Sudeep Manithara Vamanan, Munich (DE); Pavan Nuggehalli, San Carlos, CA (US); Krisztian Kiss, Hayward, CA (US); Vijay Venkataraman, San Jose, CA (US); Haijing Hu, Beijing (CN)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 17/882,765

(22) Filed: Aug. 8, 2022

(65) Prior Publication Data

US 2023/0069008 A1  Mar. 2, 2023

Related U.S. Application Data

(60) Provisional application No. 63/240,302, filed on Sep. 2, 2021.

(51) Int. Cl.
*H04W 28/02* (2009.01)
*H04L 1/1607* (2023.01)
(Continued)

(52) U.S. Cl.
CPC ....... *H04W 28/0268* (2013.01); *H04L 1/1642* (2013.01); *H04W 28/04* (2013.01); *H04W 28/06* (2013.01)

(58) Field of Classification Search
CPC . H04W 28/0268; H04W 28/02; H04W 28/04; H04W 28/06; H04L 1/1642; H04L 5/0064; H04L 69/22
See application file for complete search history.

(56) References Cited

U.S. PATENT DOCUMENTS

2008/0123660 A1  5/2008  Sammour
2013/0326034 A1*  12/2013  Shaik ............... H04L 41/082
                                                    709/228
(Continued)

FOREIGN PATENT DOCUMENTS

| CN | 106537857 | 3/2017 |
| CN | 110463254 | 11/2019 |
| CN | 112804711 | 5/2021 |

OTHER PUBLICATIONS

Extended European Search Report for EP Patent Application No. 22190260.4; 10 pages; Dec. 23, 2022.
(Continued)

*Primary Examiner* — Mansour Oveissi
(74) *Attorney, Agent, or Firm* — Kowert, Hood, Munyon, Rankin & Goetzel, P.C.

(57) ABSTRACT

This disclosure relates to techniques for supporting multiple Quality of Service flows for a service data flow in a wireless communication system. The service data flow may include multiple categories of data with different Quality of Service parameters. Separate Quality of Service flows may be established for each of the categories of data with different Quality of Service parameters. A cellular network and a wireless device communicating data for the service data flow may apply packet detection rules or packet filters to determine on which Quality of Service Flow to communicate data packets of the service data flow, and may communicate the data packets accordingly.

20 Claims, 6 Drawing Sheets

(51) Int. Cl.
*H04W 28/04* (2009.01)
*H04W 28/06* (2009.01)

(56) References Cited

U.S. PATENT DOCUMENTS

2019/0349810 A1* 11/2019 Cho ..................... H04W 28/06
2020/0389813 A1    12/2020 Hande
2021/0105657 A1*  4/2021 Hu .................... H04W 28/0268

OTHER PUBLICATIONS

Office Action for CN 202211065324.4; Jun. 16, 2025.
3GPP,3rd Generation Partnership Project; Technical Specification Group Services and System Aspects; System architecture for the 5G System (5GS); Stage 2 (Release 17); 3GPP TS 23.501 V17.1.1; Jun. 24, 2021.
TCL Communication Ltd "New Solution for Key Issue #4: QoS level support for Multicast and Broadcast communication services" SA WG2 Meeting #140E S2-2004826; Aug. 24, 2020.
Qualcomm Inc "Potential Enhancements for XR" 3GPP TSG RAN WG1 #106-e R1-2107377; Aug. 16, 2021.
Tencent et al. "New SID on Enhancements on HRDLL Services" SA WG2 Meeting #146e S2-2106196; Aug. 16, 2021.

* cited by examiner

QUALITY OF SERVICE FRAMEWORK ENHANCEMENTS FOR 5G SERVICE

PRIORITY INFORMATION

This application claims priority to U.S. provisional patent application Ser. No. 63/240,302, entitled "Quality of Service Framework Enhancements for 5G Service," filed Sep. 2, 2021, which is hereby incorporated by reference in its entirety as though fully and completely set forth herein.

FIELD

The present application relates to wireless communications, and more particularly to systems, apparatuses, and methods for supporting multiple Quality of Service flows for a service data flow in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for supporting multiple Quality of Service flows for a service data flow in a wireless communication system.

According to the techniques described herein, data packets of a service data flow may include information identifying a data packet category to which they belong. Multiple such categories may be possible, potentially each with different Quality of Service parameters. The category information may be found at a fixed or predetermined location in the packets of the service data flow, or the mechanism by which the category information is provided may be configured by an application function, for example when the service data flow is created or modified.

A cellular network may be able to identify which packets of the service data flow belong to which category, for example based on the configuration by the application function. The category information may be used to establish different Quality of Service Flows for different categories of packets of the service data flow that have different Quality of Service requirements. Rules or filters for parsing data packets for the service data flow may be distributed within the cellular network, including to the wireless device with which the service data flow is established, which may allow for appropriate mapping of both uplink and downlink packets of the service data flow to the corresponding Quality of Service Flows established for them, and for transmission of those packets via those Quality of Service Flows.

Techniques are also described herein for establishing a relation between multiple Quality of Service Flows. Such techniques may be used, for example, to coordinate scheduling of data packets of related Quality of Service flows to reduce application waiting times. Additionally, techniques are described for identifying related packets within a Quality of Service flow. Such techniques may be useful for improving the efficiency of network communication, for example by enabling dropping of packets that are dependent on other packets that are unable to be transmitted (for example, due to congestion), thereby potentially preventing transmission of packets that would not be useable at the receiver.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
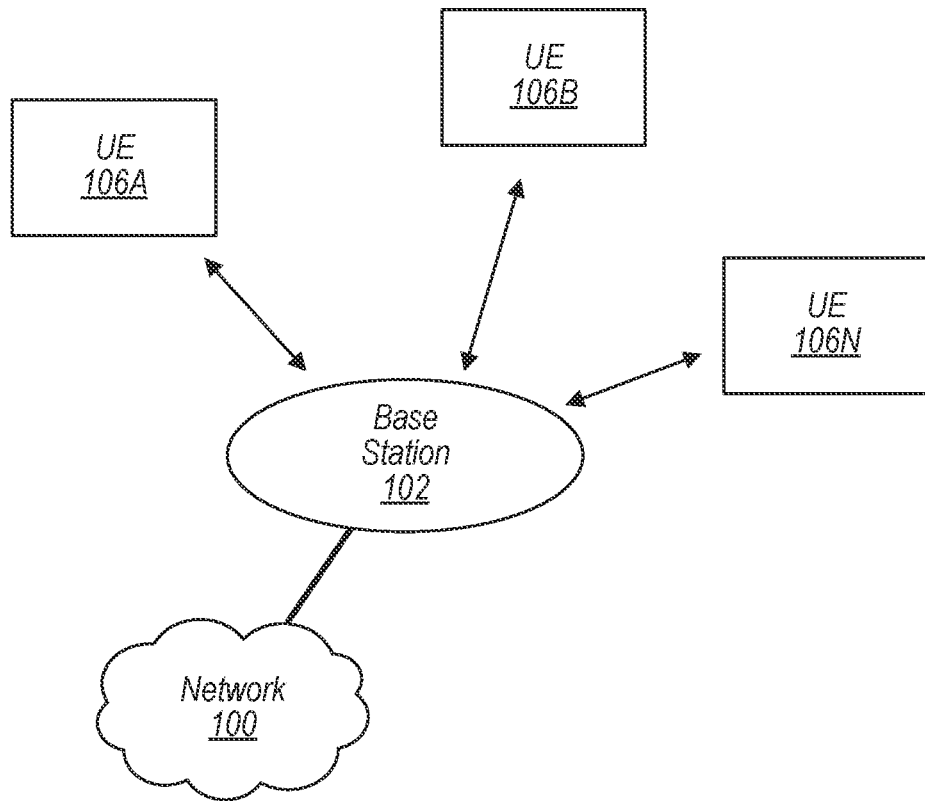
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
RAN: Radio Access Network
DL: Downlink
UL: Uplink
QoS: Quality of Service
QFI: QOS Flow Indicator
5QI: 5G QOS Identifier
SDF: Service Data Flow
IP: Internet Protocol
PDCP: Packet Data Convergence Protocol
RLC: Radio Link Control
RRC: Radio Resource Control
AF: Application Function
PCF: Policy Control Function
SMF: Session Management Function
UPF: User Plane Function
ADU: Application Data Unit Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
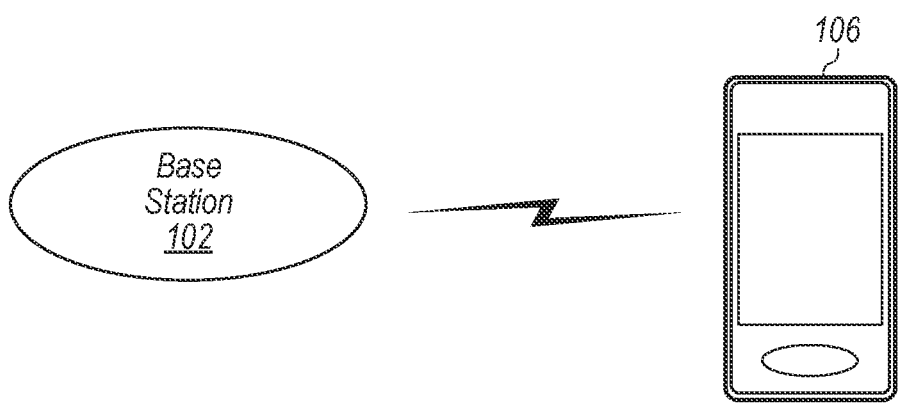
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the Ues 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of Ues, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for supporting multiple Quality of Service flows for a service data flow in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
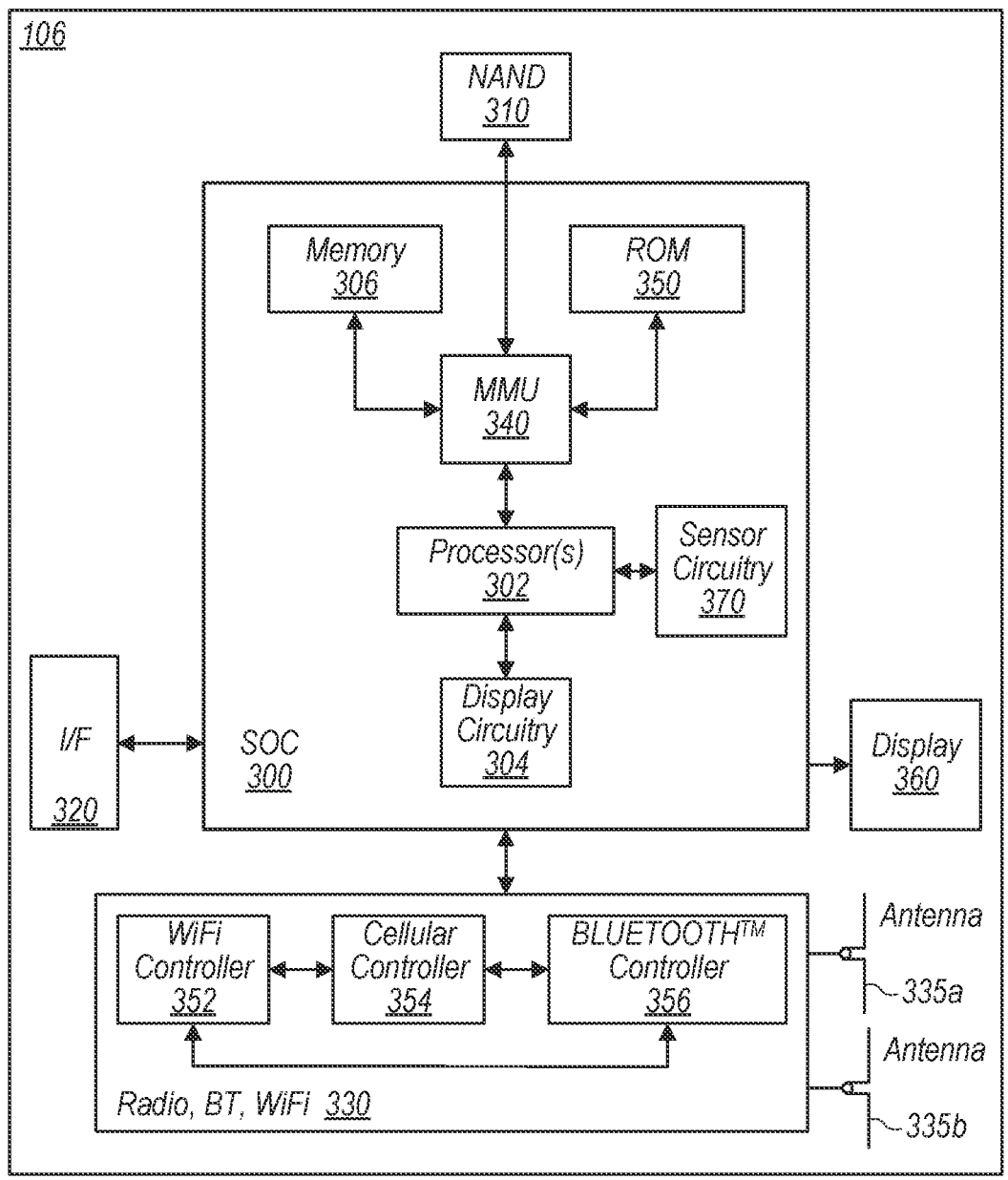
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for supporting multiple Quality of Service flows for a service data flow in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for supporting multiple Quality of Service flows for a service data flow in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
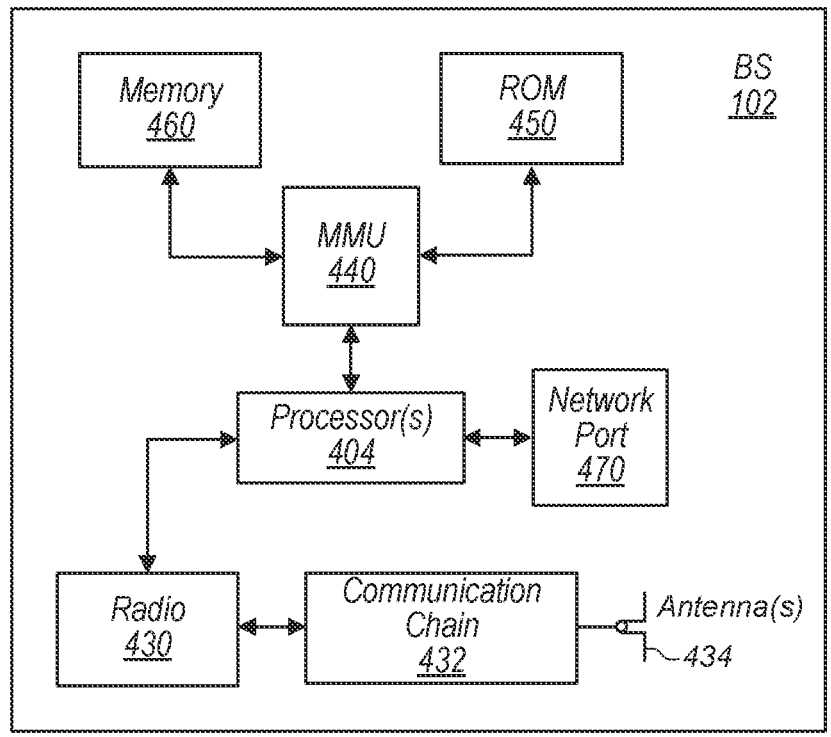
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard.

Figure 5:
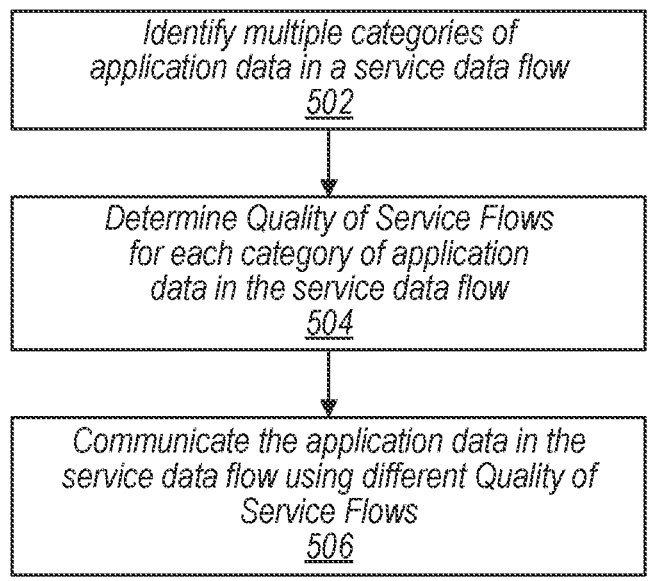
FIG. 5 is a flowchart diagram illustrating aspects of an exemplary possible method for supporting multiple Quality of Service flows for a service data flow in a wireless communication system, according to some embodiments.

FIG. 5—Supporting Multiple Quality of Service Flows for a Service Data Flow

A common type of data communication may include exchanging Internet Protocol (IP) packets between endpoints (such as between an application function provided by an application server and a corresponding application executing on a wireless device, among various other possible scenarios) in a service data flow. In some scenarios, it may be possible that such a service data flow includes different portions with different Quality of Service (QOS) parameters, such that they may need or otherwise benefit from different QoS treatment.

In some instances, a cellular communication system (such as a 3GPP 5th generation (5G) new radio (NR) cellular communication system) may form at least a portion of the data communication path for such a service data flow. Accordingly, to provide effective support for the possibility that a service data flow could include multiple types of data with different Qos needs, it may be beneficial to specify techniques for supporting multiple QoS flows for a service data flow in a cellular network. To illustrate one such set of possible techniques, FIG. 5 is a flowchart diagram illustrating a method for supporting multiple QoS flows for a service data flow in a wireless communication system, at least according to some embodiments.

Aspects of the method of FIG. 5 may be implemented by a wireless device and/or a cellular network element, such as a UE 106 and a BS 102 illustrated in and described with respect to various of the Figures herein, a user plane function (UPF), session management function (SMF), policy control function (PCF), or other cellular network element, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

A service data flow (SDF) may be established between the wireless device and an application function (AF) via the wireless link. The SDF may include multiple categories of data. The different categories of data may have different QoS parameters. For example, the SDF could include a category of data packets with stricter QoS requirements (e.g., reliability, delay budget etc.), and a category of data packets with less strict QoS requirements. SDFs with more than two categories of data packets (and more than two sets of QoS parameters) are also possible.

In 502, the multiple categories of application data may be identified in the SDF. The categories may be identified by the wireless device and/or by one or more cellular network elements. The category to which a data packet of the SDF belongs may be identified by the wireless device, and/or by one or more cellular network elements, based at least in part on IP header information for each such packet, according to some embodiments. For example, such category information may be derived from Traffic Class and/or Type of Service (ToS) information from IP packet headers, from Flow Type information in IPV6 headers, or a combination thereof. In some instances, these header fields may be set to standardized 5G QoS Identifier (5QI) values. In some instances, the AF may provide a mapping of Traffic Class/ToS values to standardized 5QI values, for example as part of AF influence of traffic routing in 5 GS. It may also be possible for category information for the SDF to be derived from higher layer headers, for example from the IP security (IPSec) header security parameters index, in the UPF. As another possibility, the AF may configure an offset in the IP packets at which the category information can be found as a rule for the SDF. For example, at an offset of "x" bits, the "y" bits in the IP header, or L4 header, could carry the category information. As another example, at an offset of "x" bits, the "y" bits in the next header of a specific type (e.g., TCP, UDP, ESP, etc.) could carry the category information. Numerous other mechanisms for including application data category information in SDF packets, and of identifying such application data category information by a wireless device and a cellular network, are also possible.

In 504, QOS Flows for each category of application data in the service data flow may be determined. QoS Flows for the different categories of the SDF may be established, for example between a SMF of the cellular network and the wireless device. The QoS Flows may have different QoS Flow Indicators (QFIs) and may have different 5QI values, which may be determined in accordance with the QoS parameters of the associated category. Downlink packet detection rules for the SDF may be created (e.g., by the SMF) based on the manner in which category information for the packets of the SDF is provided (e.g., as configured by the AF associated with the SDF), and may be provided to the UPF. Similarly, uplink packet filter information may be created and may be provided to the wireless device. The downlink packet detection rules and uplink packet filters may be used (e.g., by the UPF and the wireless device for downlink and uplink packets of the SDF respectively) to parse packets of the SDF to determine with which category each packet of the SDF is associated. For example, in a scenario in which there are two categories (a "first" category and a "second" category) of data packets for the SDF, the downlink packet detection rules and uplink packet filters may be used to determine whether a packet is associated with the first category of data packets for the SDF or the second category of data packets for the SDF.

In 506, the application data in the service data flow may be communicated using different QoS Flows. Downlink data packets for the QoS Flows of the SDF may be provided to the radio access network (RAN) of the cellular network (e.g., including to a cellular base station serving the wireless device), for example based on the parsing of the data packets of the SDF in accordance with the downlink packet detection rules. Data radio bearers (DRBs) configured to provide the required QoS for each QOS Flow may be established between the RAN and the wireless device, and the downlink data packets of each data packet category of the SDF may be transmitted to the wireless device using the DRB for the QoS Flow corresponding to that data packet category. In the uplink, data packets of the SDF may similarly be parsed by the wireless device in accordance with the provided packet filters for the SDF, and the uplink data packets of each data packet category of the SDF may be transmitted to the serving cellular base station using the DRB for the QoS Flow corresponding to that data packet category.

In some instances, there may be a relationship between the QoS Flows of a SDF. Such a relationship may include one QoS Flow depending on another (e.g., a lower priority QoS Flow depending on a higher priority QoS Flow), or any of a variety of other types of relationships. The relationship may be identified by the wireless device, for example based on parsing of uplink or downlink packets. In such a scenario, the wireless device may provide an indication of the identified relationship to the cellular network, for example by providing a protocol data unit (PDU) session modification request to the SMF. The SMF may verify whether the indicated relationship between the QoS Flows is allowed according to one or more cellular network policies (e.g., as provided by the PCF). If it is verified, the SMF may acknowledge the relation between the QoS Flows, for example by providing a PDU session modification command to the wireless device. As another possibility, the relationship may be identified by the UPF or another cellular network element, for example similarly based on parsing of uplink or downlink packets. In such a scenario, the SMF may be informed, and a network initiated PDU session modification may be used to provide indication of the relationship between the QoS Flows to the wireless device. In either such scenario, the SMF may provide an indication of the identified relationship to the RAN, which may perform scheduling for downlink and/or uplink communications for the QoS Flows based at least in part on the relationship between them. For example, the RAN may attempt to schedule packets of the related QoS Flows together to reduce waiting time at the application client.

In some embodiments, certain sequences of packets within the same QoS Flow of an SDF may further be grouped into sets of packets that have a strong relation with each other. Such sequences of packets may be referred to herein as application data units (ADUs). Identification of an ADU of a QoS Flow may be performed in any of a variety of ways. One possibility may include the use of uplink packet descriptors that provide rich metadata (e.g., Flow ID information, which may identify packets of a specific flow). In the downlink, configuration of an ADU identification mechanism may be performed by the AF, or an in-band mechanism in the IP packets may be utilized. In some instances, identification of the parts of an ADU may be carried along with QFI information in the GTP header in the downlink. Other techniques and mechanisms are also possible.

It may be possible that the relation between the parts of an ADU is sufficiently strong that if one portion of an ADU is lost or otherwise unable to be communicated, the remaining parts are not useful to the receiver. Accordingly, it may be possible that the wireless device could make packet discarding decisions in the uplink, and/or that the cellular base station could make packet discarding decisions in the downlink, based at least in part on identification of such a relation between two packets of a QoS Flow.

For example, as one possibility, it may be possible that the wireless device can determine that a ("first") uplink packet of a QoS Flow is not successfully transmitted (e.g., due to congestion, as one possibility) at a packet data convergence protocol (PDCP) layer of the wireless device. The wireless device may determine that a ("second") uplink packet of the QoS Flow is dependent on the first uplink packet of the QoS Flow (e.g., they are identified as belonging to the same ADU), and may drop the second uplink packet of the QoS Flow at the PDCP layer of the wireless device based at least in part on the second uplink packet of the QoS Flow being dependent on the first uplink packet of the QoS Flow.

To account for the dropped packet with respect to PDCP sequence numbering, the PDCP layer of the wireless device may provide an indication that the second uplink packet of the QoS Flow is dropped to the cellular network. Alternatively, PDCP sequence numbers (SNs) may be re-numbered to account for the dropped packet, or a dummy PDCP packet with a PDCP SN corresponding to the PDCP SN of the dropped packet may be created.

Additionally, or alternatively, it may be possible to make packet discarding decisions based at least in part on identification of a relation between two packets of a QoS Flow at the RLC layer of a wireless device. For example, continuing the preceding example, if the second uplink packet of the QoS Flow were already submitted from PDCP to RLC, it may be possible that the second uplink packet of the QoS Flow is dropped at the RLC layer of the wireless device, and that an indication that the second uplink packet of the QoS Flow is dropped at the RLC layer of the wireless device is provided to the cellular network.

If provided by the wireless device in such scenarios, the cellular network (e.g., the serving cellular base station) may receive the indication of one or packet sequence numbers that are not transmitted by the wireless device at the PDCP or RLC layer of the wireless device at the corresponding layer of the cellular network. In such a case, the receiver may be able to determine to skip waiting for the indicated packet sequence numbers and continue with processing any subsequently received packets.

As another example, it may be possible that the cellular base station can determine that a ("first") downlink packet of a QoS Flow is not successfully transmitted (e.g., due to congestion, as one possibility) at a packet data convergence protocol (PDCP) layer of the cellular base station. The cellular base station may determine that a ("second") downlink packet of the QoS Flow is dependent on the first downlink packet of the QoS Flow (e.g., they are identified as belonging to the same ADU), and may drop the second downlink packet of the QoS Flow at the PDCP layer of the cellular base station based at least in part on the second downlink packet of the QoS Flow being dependent on the first downlink packet of the QoS Flow.

To account for the dropped packet with respect to PDCP sequence numbering, the PDCP layer of the cellular base station may provide an indication that the second downlink packet of the QOS Flow is dropped to the wireless device.

Additionally, or alternatively, it may be possible to make packet discarding decisions based at least in part on identification of a relation between two packets of a QoS Flow at the RLC layer of a cellular base station. For example, continuing the preceding example, if the second downlink packet of the QoS Flow were already submitted from PDCP to RLC, it may be possible that the second downlink packet of the QoS Flow is dropped at the RLC layer of the cellular base station, and that an indication that the second downlink packet of the QoS Flow is dropped at the RLC layer of the cellular base station is provided to the wireless device.

If provided by the cellular base station in such scenarios, the wireless device may receive the indication of one or packet sequence numbers that are not transmitted by the cellular base station at the PDCP or RLC layer of the cellular base station at the corresponding layer of the wireless device. In such a case, the receiver may be able to determine to skip waiting for the indicated packet sequence numbers and continue with processing any subsequently received packets.

Thus, at least according to some embodiments, the method of FIG. 5 may be used to support multiple QoS flows for a service data flow, which may better meet the needs of services with multiple portions that need or otherwise benefit from differentiated QoS treatment, at least in some instances.

Figure 6:
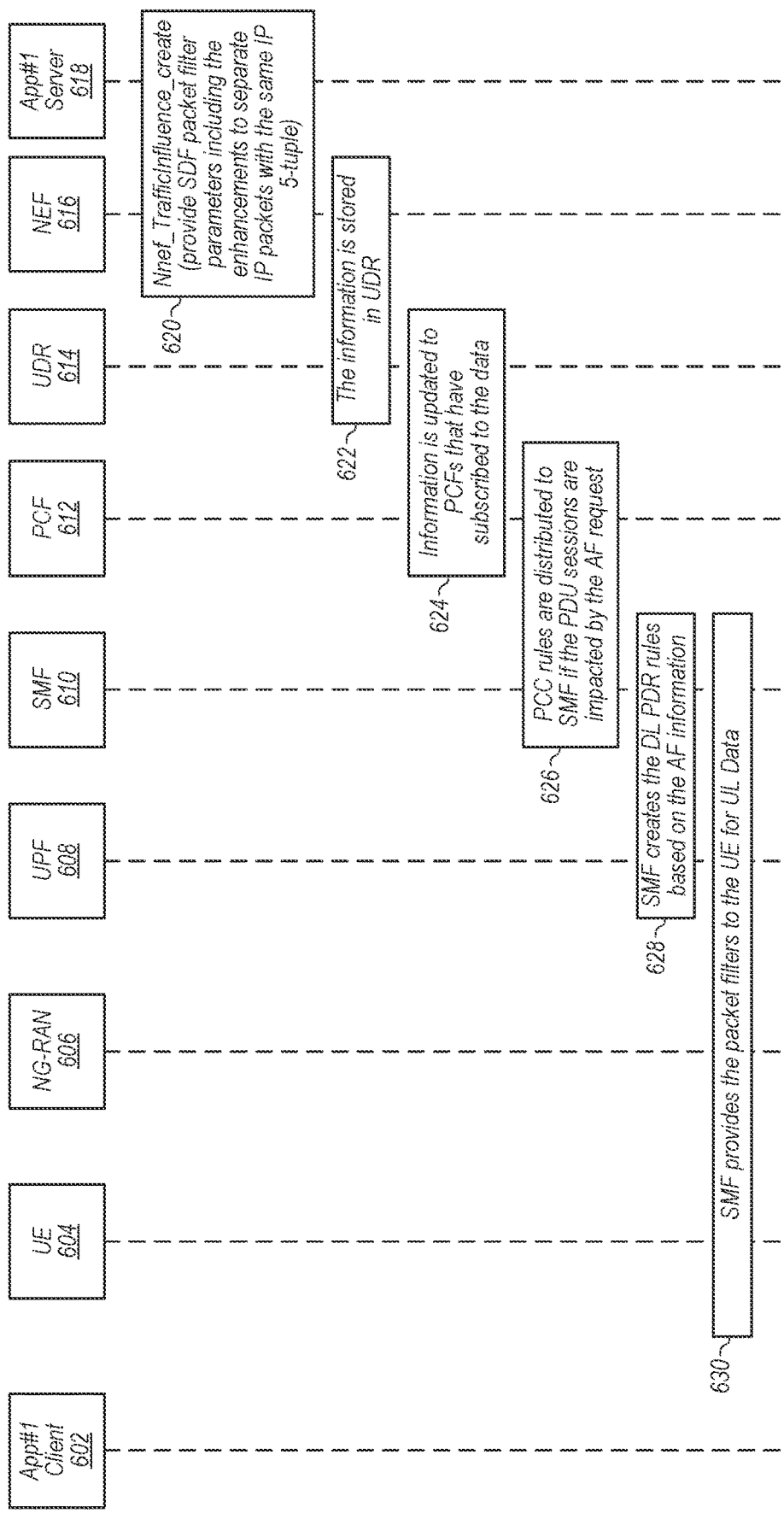
FIGS. 6-8 are communication flow diagrams illustrating various exemplary aspects of a possible method for supporting multiple Quality of Service flows for a service data flow in a wireless communication system, according to some embodiments.
Figure 7:
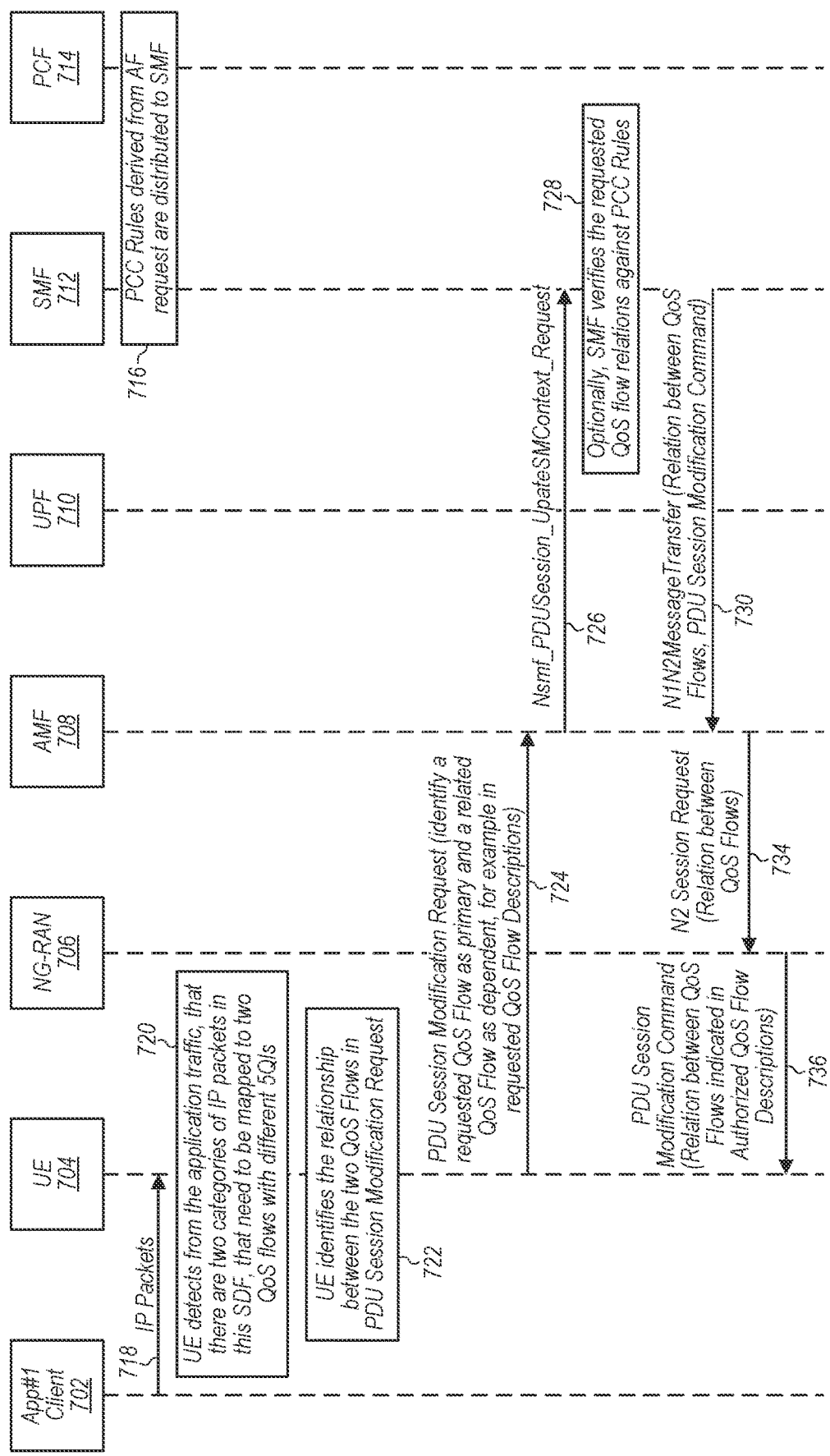
Figure 8:
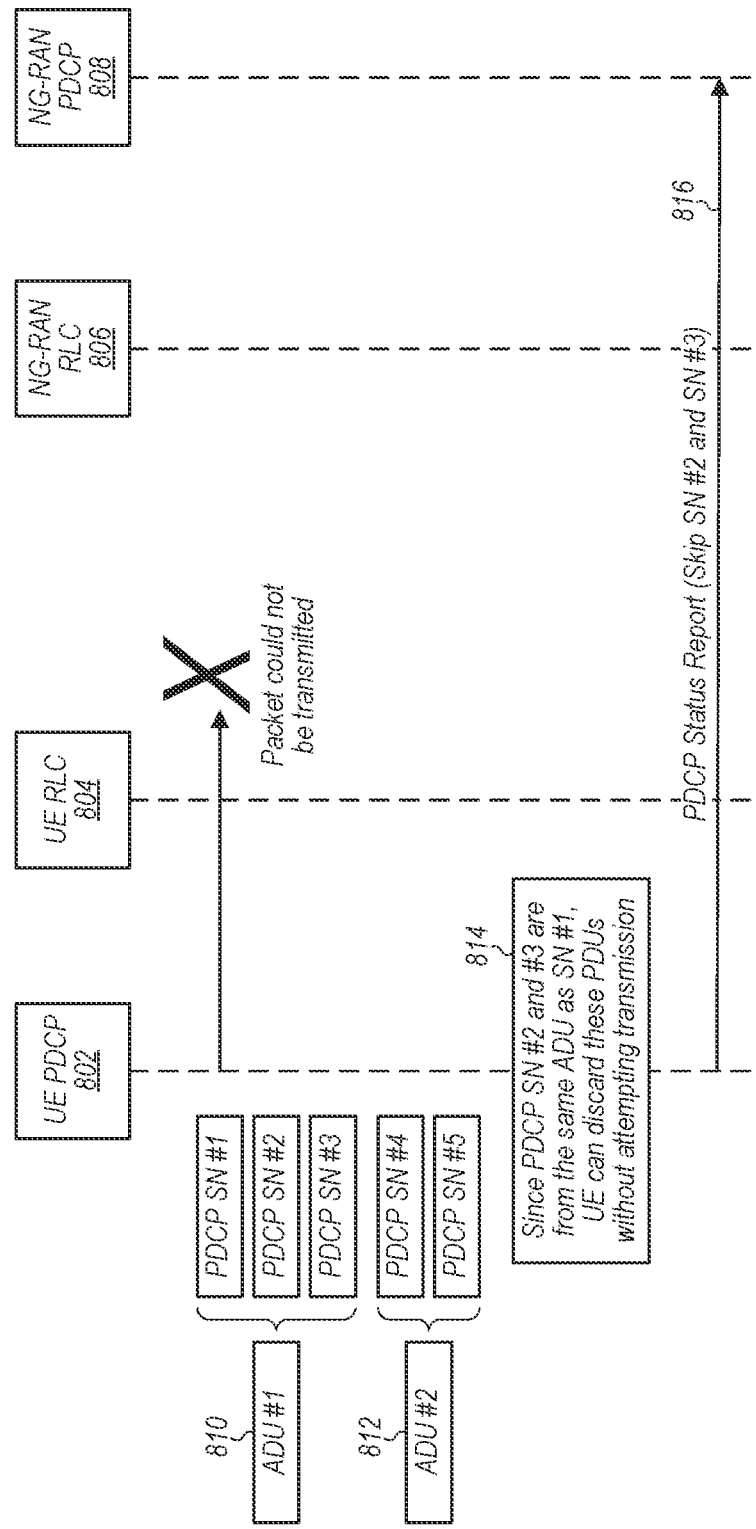

FIGS. 6-8 and Additional Information

FIGS. 6-8 illustrate further aspects that might be used in conjunction with the method of FIG. 5 if desired. It should be noted, however, that the exemplary details illustrated in and described with respect to FIGS. 6-8 are not intended to be limiting to the disclosure as a whole: numerous variations and alternatives to the details provided herein below are possible and should be considered within the scope of the disclosure.

A service data flow (SDF), which may flow between a wireless device and a cellular network in accordance with 5G NR service (5GS), at least according to some embodiments, could potentially include Internet Protocol (IP) packets or sequences of IP packets that need or otherwise benefit from differentiated QoS treatments. For example, a sequence of IP packets may belong to an I-Frame of video encoding for a video stream SDF, and may include video encoding and/or commands of higher importance (e.g., translated in QoS terms as having stricter reliability, delay budget, etc., needs) than a sequence of IP packets carrying a P-Frame or B-frame for the video stream SDF, which may depend on previous or following frames, at least in some instances. In addition or alternatively to video encoding use cases, extended reality (XR) or augmented reality (AR), multimodal, haptics, and/or any of a variety of other possible use cases may also potentially include different types of packets for which different QoS treatment may be preferred or required.

In 5GS as currently defined, there may be a mechanism of packet filters to map IP packets from an SDF (identified by a IP 5-tuple) to a QoS Flow Indicator (QFI). There may be no more finely grained differentiation of IP packets belonging to an SDF. The radio access network (RAN) may treat IP packets at a DRB level of granularity, such that the RAN may not be aware of different QFIs mapped to a DRB.

At least according to some embodiments, a sequence of IP packets of a SDF that contains one type of frames may be considered as or referred to as an Application Data Unit (ADU). It may be beneficial to provide a 5GS QoS framework that can account for such ADUs that need distinct QoS treatment within an SDF, e.g., since existing 5GS mechanisms do not currently provide such capability.

As one aspect of such a framework, it may be possible to define certain categories, where ADUs from an SDF may be classified as belonging to different categories. Continuing the previous example of an encoded video stream, such category assignment could include categorizing I-Frames as a Category 1 (Cat-1), of higher priority and import, and categorizing P-Frames as Category 2 (Cat-2), of lower priority and import. Thus, a single SDF may carry ADUs of multiple categories. The "Category" concept may be defined as an attribute in 5GS, where categories can define the QoS treatment offered by 5GS (e.g., Cat-1 can have a stricter latency/reliability requirement than Cat-2, as one possibility).

Another aspect of such a framework may include how to identify and communicate category information within a 5GS communication system. In one set of embodiments, 5GS may derive categories from information in IP headers. For example, category information may be indicated explicitly or implicitly by way of Traffic Class/ToS, Flow Type in IPV6, or a combination thereof. In one option, these header fields may be set to standardized 5GS 5G QOS Indicator (5QI) values. In another option, an application function (AF) may provide a mapping of Traffic Class/ToS or Flow Type values to standardized 5QI values to 5GS as part of the influence by the AF on traffic routing in 5GS. As still another possibility, the category information may be derived in the user plane function (UPF), for example by deriving the information from the higher layer headers, such as from the IPSec header Security parameters index. As still another possibility, the AF may configure as a rule a generic offset in the IP packet to define where the category information is found. For example, at an offset of "x" bits, the "y" bits in the IP header, or L4 header, carries the category information for an IP packet. As another example, at an offset of "x" bits, the "y" bits in the next header of a specific type (e.g., "TCP", or "UDP", or "ESP") carries the category information for an IP packet. In any of the various scenarios in which the category information is derived at the UPF, the UPF may be able to detect the category field from the incoming IP packets and apply the downlink (DL) packet detection rule (PDR) (e.g., SDF+category information) to map the IP packets to different QoS Flow Identifiers (QFIs).

FIG. 6 is a communication flow diagram illustrating aspects of one possible approach to assigning ADUs of an SDF to different QFIs, according to some embodiments. As shown, the illustrated communication flow may be performed between a UE 604 (which may include an application client 602 (e.g., for an application "App #1")), a NG-RAN 606, a UPF 608, a session management function (SMF) 610, a policy and control function (PCF) 612, a user data repository (UDR) 614, a network exposure function (NEF) 616, and an application server 618 for the application App #1.

In 620, the application server 618 may provide a Nnef_TrafficInfluence_create message to the NEF 616, which may provide SDF packet filter parameters including the enhancements to separate IP packets with the same IP 5-tuple for potentially different QoS handling. In 622, the information may be stored in the UDR 614. In 624, the information is updated to PCFs that have subscribed to the data. In 626, PCC rules may be distributed to the SMF if there are PDU sessions impacted by the AF request. In 628, the SMF may create the DL PDR rules based on the AF information. In 630, the SMF may provide the packet filters to the UE for UL data.

Basic IP packet handling in accordance with such a framework in the downlink may include using IP packet filters for the categorization of IP packets in the UPF, with the UPF mapping the different categories of IP packets to different QoS flows within the same PDU session according to configured QoS rules. In the uplink, configured packet filters may be used to guide categorization of IP packets at a UE.

Another aspect of such a framework may include providing techniques for identifying the relationship between ADUs with different QFIs. FIG. 7 is a communication flow diagram illustrating aspects of one such possible approach. As shown, the illustrated communication flow may be performed between a UE 704 (which may include an application client 702 (e.g., for an application "App #1")), a NG-RAN 706, an access and management function (AMF) 708, a UPF 710, a SMF 712, and a PCF 714.

In the illustrated example scenario, in 716, PCC rules derived from an AF request may be distributed from the PCF 714 to the SMF 712. In 718, IP packets may be provided from the application client 702 of the UE 704 to UE baseband. In 720, for the uplink application traffic, the UE baseband 704 may detect that there are multiple categories associated with IP packets of a SDF, that should be mapped to different QoS Flows with different 5QIs. In 722, the UE 704 may identify the relationship between the two QoS Flows in a PDU Session Modification Request, which may be provided to the AMF 708 in 724. In 726, the AMF 708 may provide a Nsmf_PDUSession_UpdateSMContext_Request message to the SMF 712. In 728, the SMF may optionally verify the requested QoS Flow relations against the provided PCC rules. In 730, the SMF 712 may provide a N1N2MessageTransfer message to the AMF 708, which may confirm the relation between the QoS Flows and provide a PDU Session Modification Command. In 734, the AMF 708 may provide a N2 Session Request (indicating the relation between the QoS Flows) to the NG-RAN 706. In 736, the NG-RAN 706 may provide the PDU Session Modification Command to the UE 704, confirming the relation between QoS Flows indicated in authorized QoS Flow descriptions.

Thus, the UE and the network may be able to identify and distribute knowledge of the mapped QoS flows and the relationship between the QoS flows. Note that it may also be possible for a relationship between QoS Flows to be detected at the UE side based on downlink reception of IP packets of related QoS Flows. Such techniques may thus potentially support the possibility for a QFI to be marked as dependent on another QFI. Such a function may be useful in a scenario in which a QFI to which P-Frames of an encoded video stream are mapped is marked as "dependent" on the QFI carrying I-Frames of the stream (e.g., which may be identified as "primary"), among various other possible use cases. The information about the relationship between QoS Flows can be used to optimize synchronization between the packets in the different QoS Flows; for example, the primary and dependent QoS Flows could be scheduled together in downlink to reduce waiting time in the application client, at least in some instances.

As illustrated in FIG. 7, it may be possible that the relationship information for related QoS Flows may be provided from the UE to the network in a PDU Session Modification Request from the UE to the SMF, as one possibility. According to some embodiments, the SMF may optionally verify the UE requested relationship between QoS Flows with the policies provided by the PCF, e.g., to confirm that the requested relationship is allowed and/or supported according to those policies. The SMF may acknowledge the indicated relationship between the QoS Flows in a PDU Session Modification Command. The SMF may set up the PDRs in the UPF and provide the corresponding packet filters to the UE, and may communicate the relationship between the QFIs to the NG-RAN (e.g., to help support the possibility of increased synchronization between the transmissions of packets of the related QoS Flows). However, it should be noted that it may also be possible for a relationship between QoS Flows to be detected at the network side, for example by the UPF. In such a scenario, a network initiated PDU Session Modification Command may be provided to the UE to indicate the detected relationship, and the UPF may also inform the SMF and the NG-RAN of the relationship between the QFIs.

As previously noted herein, an ADU in a QoS Flow may include one or more IP packets. The IP packets belonging to an ADU within the same QoS Flow may have a strong relation between them. For example, at least in some instances, it could be the case that a receiver is unable to use only part of an ADU, such that if only 2 out of 3 IP packets belonging to an ADU are successfully delivered, the ADU as a whole may remain unusable. Accordingly, it may be possible for relationship information for IP packets belonging to an ADU to be used to determine when to drop a functionally useless IP packet, for example if another IP packet on which use of the IP packet depends has been lost or could not be transmitted.

The identification of parts of an ADU could be performed in any of various ways. For example, implementation specific techniques, such as using packet descriptors that provide rich metadata (Flow ID, which identifies all packets of a specific Flow) in the uplink, could be used. In the downlink, the identification could be configured by the AF or by in-band mechanisms in the IP packets. Identification of the parts of an ADU may be carried along with QFI information on the GPRS tunnelling protocol (GTP) header for downlink; the RAN may be able to use this information to decide the packets that may be dropped in case of congestion, at least in some instances.

In some embodiments, such "smart" discarding may be performed in the packet data convergence protocol (PDCP) layer based on the outcome for a dependent IP packet of the ADU. For example, for a UE that has identified the mapping of PDCP sequence numbers (SNs) 1, 2, and 3 as belonging to one ADU, if PDCP PDU with SN #1 has been discarded (e.g., due to congestion), then it may be the case that the UE also drops PDCP SN #2 and PDCP SN #3 at the UE, e.g., because it may be known that the receiver cannot work with an incomplete ADU.

In one implementation, it may be possible that the rest of the IP packets for such an ADU are dropped by the PDCP. PDCP PDUs with SN #2 and SN #3 may be recreated, however, this may lead to more load on UE processing, e.g., for ciphering. As an alternative option, PDCP dummy PDUs may be created with SN #2 and SN #3. In another implementation, it may be possible that the UE informs the network of the dropped SNs in the PDCP Status Reports. This may facilitate the receiver stopping waiting for these SNs to ensure in-order delivery. In the downlink direction, the gNB may identify the relationship between the PDCP PDUs as part of an ADU. In case of dropping SNs due to the discard of a related PDCP PDU, the gNB may send a PDCP Status Report indicating the SNs that will not be transmitted, at least as one possibility.

FIG. 8 is a communication flow diagram illustrating aspects of one possible approach to handling intra-ADU IP frames within a QFI, according to some embodiments. As shown, the illustrated communication flow may be performed between a UE PDCP entity 802, a UE RLC entity 804, a NG-RAN RLC entity 806, and a NG-RAN PDCP entity 808.

In the illustrated scenario, a first ADU ("ADU #1") 810 may include the PDCP SNs #1, #2, and #3. Additionally, a second ADU ("ADU #2") 812 may include the PDCP SNs #4 and #5. The PDCP SN #1 may be unable to be transmitted, and as the PDCP SN #2 and #3 are from the same ADU as SN #1, in 814, the UE may also discard these PDUs without attempting transmission. In 816, the UE PDCP 802 may provide a PDCP Status Report indicating that SN #2 and SN #3 are skipped to the NG-RAN PDCP 808. The PDCP SN #4 and SN #5 of the second ADU 812 may be handled independently from the PDCP SN #1, #2, and #3, e.g., since they belong to a different ADU.

In case some dependent PDCP PDUs are already submitted to RLC when it is determined that a PDCP PDU on which they depend cannot be transmitted, a smart automatic repeat request (ARQ) approach based on interested packets in the uplink may be used. In particular, following the preceding example, in case the PDCP PDUs with SN #2 and SN #3 have already been submitted to the RLC layer, the UE may employ the smart ARQ mechanism to avoid further delay. The UE RLC may drop the RLC PDUs carrying the PDCP PDU SN #2 and SN #3 locally and may send a RLC status report to indicate the skipped SNs to the NG-RAN RLC. A similar smart ARQ approach based on interested packets in the downlink may also be used. Again following the preceding example, in case the PDCP PDUs with SN #2 and SN #3 have already been submitted to the RLC layer, the gNB may employ the smart ARQ mechanism to avoid further delay. The gNB RLC may drop the RLC PDUs carrying the PDCP PDU SN #2 and SN #3 locally and may send a RLC status report to indicate the skipped SNs to the UE RLC. Such mechanisms may allow the corresponding entities (e.g., NR-RAN RLC in the uplink scenario or UE RLC in the downlink scenario) to stop waiting for any skipped packets before providing successfully received packets with subsequent SNs to the PDCP for in-order delivery, at least according to some embodiments.

In the following further exemplary embodiments are provided.

One set of embodiments may include an apparatus, comprising: a processor configured to cause a wireless device to: establish a service data flow (SDF) with an application function (AF) via a cellular network; determine that the SDF includes at least two categories of data, wherein a first category of data for the SDF has different Quality of Service (QOS) parameters than a second category of data for the SDF; communicate the first category of data for the SDF using a first QoS Flow; and communicate the second category of data for the SDF using a second QoS Flow, wherein the first category of data for the SDF and the second category of data for the SDF are communicated using different QoS Flows based at least in part on determining that the first category of data for the SDF has different QoS parameters than the second category of data for the SDF.

According to some embodiments, the processor is further configured to cause the wireless device to: parse packets of the SDF according to a packet filter to determine whether the packets of the SDF are associated with the first category of data for the SDF or the second category of data for the SDF.

According to some embodiments, the packet filter determines whether the packets of the SDF are associated with the first category of data for the SDF or the second category of data for the SDF based on one or more of: Internet Protocol (IP) header information indicating Traffic Class or Type of Service (ToS); IPv6 Flow Type information; IP Security (IPSec) header Security parameters index information; or an offset value indicating a location of category information in packets of the SDF.

According to some embodiments, the processor is further configured to cause the wireless device to: provide an indication to the cellular network of a relationship between the first Qos Flow and the second QoS Flow.

According to some embodiments, the processor is further configured to cause the wireless device to: determine that a first uplink packet of the first QoS Flow is not successfully transmitted at a packet data convergence protocol (PDCP) layer of the wireless device; determine that a second uplink packet of the first QoS Flow is dependent on the first uplink packet of the first QoS Flow; and drop the second uplink packet of the first QoS Flow at the PDCP layer of the wireless device based at least in part on the second uplink packet of the first QoS Flow being dependent on the first uplink packet of the first QoS Flow.

According to some embodiments, determining that the second uplink packet of the first QOS Flow is dependent on the first uplink packet of the first QoS Flow is based on packet descriptor information included in the first uplink packet of the first QoS Flow and the second uplink packet of the first QoS Flow.

According to some embodiments, based at least in part on the second uplink packet of the first QoS Flow being dropped at the PDCP layer of the wireless device, the processor is further configured to cause the wireless device to perform one or more of: providing an indication that the second uplink packet of the first QoS Flow is dropped at the PDCP layer of the wireless device to the cellular network; re-numbering PDCP sequence numbers (SNs) at the PDCP layer of the wireless device; or creating a dummy PDCP packet with a PDCP SN corresponding to a PDCP SN of the second uplink packet of the first QoS Flow at the PDCP layer of the wireless device.

According to some embodiments, the processor is further configured to cause the wireless device to: determine that a first uplink packet of the first QoS Flow is not successfully transmitted at a radio link control (RLC) layer of the wireless device; determine that a second uplink packet of the first QoS Flow is dependent on the first uplink packet of the first QoS Flow; drop the second uplink packet of the first QOS Flow at the RLC layer of the wireless device based at least in part on the second uplink packet of the first QoS Flow being dependent on the first uplink packet of the first QoS Flow; and provide an indication that the second uplink packet of the first QoS Flow is dropped at the RLC layer of the wireless device to the cellular network.

According to some embodiments, the processor is further configured to cause the wireless device to: receive an indication of one or more packet sequence numbers that are not transmitted to the wireless device by the cellular network at a packet data convergence protocol (PDCP) layer or a radio link control (RLC) layer of the wireless device.

Another set of embodiments may include a cellular network element, comprising: a processor; and a network interface operably coupled to the processor, wherein the cellular network element is configured to: determine that a service data flow (SDF) between an application function (AF) and a wireless device includes at least two categories of packets, wherein a first category of packets of the SDF has different Quality of Service (QOS) parameters than a second category of packets of the SDF; establish a first QoS Flow for the first category of packets of the SDF; and establish a second QoS Flow for the second category of packets of the SDF.

According to some embodiments, the cellular network element is further configured to: provide downlink packet detection rules for the SDF to a second cellular network element and uplink packet filter information to the wireless device, wherein the downlink packet detection rules and uplink packet filter information are configured for determining whether packets of the SDF are associated with the first category of packets of the SDF or the second category of packets of the SDF, wherein the downlink packet detection rules and the uplink packet filter information are based on one or more of: Internet Protocol (IP) header information indicating Traffic Class or Type of Service (ToS) for the packets of the SDF; IPV6 Flow Type information for the packets of the SDF; IP Security (IPSec) header Security parameters index information for the packets of the SDF; or an offset value indicating a location of category information in the packets of the SDF.

According to some embodiments, the cellular network element is further configured to: determine a relationship between the first QoS Flow and the second QoS Flow; and provide an indication of the relationship between the first QoS Flow and the second QoS Flow to a second cellular network element.

According to some embodiments, the cellular network element is further configured to: receive an indication of the relationship between the first QoS Flow and the second QoS Flow from the wireless device.

According to some embodiments, the cellular network element is further configured to: verify whether the relationship between the first QoS Flow and the second QoS Flow is allowed according to one or more cellular network policies.

Yet another set of embodiments may include a cellular base station, comprising: an antenna; a radio operably coupled to the antenna; and a processor operably coupled to the radio; wherein the cellular base station is configured to: establish a wireless link with a wireless device; transmit first packets to the wireless device on the wireless link using a first QoS Flow; and transmit second packets to the wireless device on the wireless link using a second QoS Flow, wherein both the first packets and the second packets are associated with a service data flow (SDF).

According to some embodiments, the cellular base station is further configured to: receive an indication of a relationship between the first QoS Flow and the second QoS Flow; and perform scheduling for one or more of downlink communications or uplink communications for the first QoS Flow and the second QoS Flow based at least in part on the relationship between the first QoS Flow and the second QoS Flow.

According to some embodiments, the cellular base station is further configured to: determine that a first downlink packet of the first QoS Flow is not successfully transmitted; determine that a second downlink packet of the first QoS Flow is dependent on the first downlink packet of the first QoS Flow; and drop the second downlink packet of the first QoS Flow based at least in part on the second downlink packet of the first QoS Flow being dependent on the first downlink packet of the first QoS Flow.

According to some embodiments, the second downlink packet of the first QoS Flow is dropped at one of a packet data convergence protocol (PDCP) layer or a radio link control (RLC) layer of the cellular base station, wherein the cellular base station is further configured to: provide an indication to the wireless device that the second downlink packet of the first QoS Flow is dropped at one of the PDCP layer or the RLC layer of the cellular base station.

According to some embodiments, determining that the second downlink packet of the first QOS Flow is dependent on the first downlink packet of the first QoS Flow is based on header information included in the first downlink packet of the first QoS Flow and the second downlink packet of the first QoS Flow.

According to some embodiments, the cellular base station is further configured to: receive an indication of one or packet sequence numbers that are not transmitted to the cellular base station by the wireless device at a packet data convergence protocol (PDCP) layer or a radio link control (RLC) layer of the cellular base station.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
establish a service data flow (SDF) with an application function (AF) via a cellular network;
determine that the SDF includes at least two categories of data, wherein a first category of data for the SDF has different Quality of Service (QOS) parameters than a second category of data for the SDF;
identify a relationship between a first QoS Flow associated with a first QoS flow indicator (QFI) and a second QoS Flow associated with a second QFI based on parsing of uplink or downlink packets, wherein the relationship comprises the first QoS Flow depending on the second QoS Flow;
indicate the relationship to the cellular network using a protocol data unit (PDU) session modification request;
receive, from the cellular network, a PDU session modification command responsive to the PDU session modification request;
communicate the first category of data for the SDF using the first QoS Flow; and
communicate the second category of data for the SDF using the second QoS Flow,
wherein the first category of data for the SDF and the second category of data for the SDF are communicated using the first QoS Flow and the second QoS Flow based at least in part on determining that the first category of data for the SDF has different QoS parameters than the second category of data for the SDF, and wherein scheduling of the first QOS Flow and the second QoS Flow is based at least in part on the relationship between them, wherein packets of the first QoS Flow and the second QoS flow are scheduled together.

2. The apparatus of claim 1, wherein the processor is further configured to cause the wireless device to:
parse packets of the SDF according to a packet filter to determine whether the packets of the SDF are associated with the first category of data for the SDF or the second category of data for the SDF.

3. The apparatus of claim 2,
wherein the packet filter determines whether the packets of the SDF are associated with the first category of data for the SDF or the second category of data for the SDF based on one or more of:
Internet Protocol (IP) header information indicating Traffic Class or Type of Service (ToS);
IPv6 Flow Type information;
IP Security (IPSec) header Security parameters index information; or an offset value indicating a location of category information in packets of the SDF.

4. The apparatus of claim 1, wherein the processor is further configured to cause the wireless device to:
determine that a first uplink packet of the first QoS Flow is not successfully transmitted at a packet data convergence protocol (PDCP) layer of the wireless device;
determine that a second uplink packet of the first QoS Flow is dependent on the first uplink packet of the first QoS Flow; and
drop the second uplink packet of the first QoS Flow at the PDCP layer of the wireless device based at least in part on the second uplink packet of the first QoS Flow being dependent on the first uplink packet of the first QoS Flow.

5. The apparatus of claim 4,
wherein determining that the second uplink packet of the first QoS Flow is dependent on the first uplink packet of the first QoS Flow is based on packet descriptor information included in the first uplink packet of the first QOS Flow and the second uplink packet of the first QoS Flow.

6. The apparatus of claim 4, wherein based at least in part on the second uplink packet of the first QOS Flow being dropped at the PDCP layer of the wireless device, the processor is further configured to cause the wireless device to perform one or more of:
providing an indication that the second uplink packet of the first QoS Flow is dropped at the PDCP layer of the wireless device to the cellular network;
re-numbering PDCP sequence numbers (SNs) at the PDCP layer of the wireless device; or
creating a dummy PDCP packet with a PDCP SN corresponding to a PDCP SN of the second uplink packet of the first QoS Flow at the PDCP layer of the wireless device.

7. The apparatus of claim 1, wherein the processor is further configured to cause the wireless device to:
determine that a first uplink packet of the first QoS Flow is not successfully transmitted at a radio link control (RLC) layer of the wireless device;
determine that a second uplink packet of the first QoS Flow is dependent on the first uplink packet of the first QoS Flow;
drop the second uplink packet of the first QoS Flow at the RLC layer of the wireless device based at least in part on the second uplink packet of the first QoS Flow being dependent on the first uplink packet of the first QoS Flow; and
provide an indication that the second uplink packet of the first QoS Flow is dropped at the RLC layer of the wireless device to the cellular network.

8. The apparatus of claim 1, wherein the processor is further configured to cause the wireless device to:
receive an indication of one or more packet sequence numbers that are not transmitted to the wireless device by the cellular network at a packet data convergence protocol (PDCP) layer or a radio link control (RLC) layer of the wireless device.

9. A cellular base station, comprising:
an antenna;
a radio operably coupled to the antenna; and
a processor operably coupled to the radio;
wherein the cellular base station is configured to:
establish a wireless link with a wireless device;
receive an indication of a relationship between a first quality of service (QOS) Flow associated with a first QoS flow indicator (QFI) and a second QoS Flow associated with a second QFI, wherein the relationship comprises the first QoS Flow depending on the second QoS Flow;
perform scheduling for one or more of downlink communications or uplink communications for the first QoS Flow and the second QoS Flow based at least in part on the relationship between the first QoS Flow and the second QoS Flow, wherein packets of the first QoS Flow and the second QoS flow are scheduled together;
transmit first packets to the wireless device on the wireless link using the first QoS Flow; and
transmit second packets to the wireless device on the wireless link using the second QoS Flow,
wherein both the first packets and the second packets are associated with a service data flow (SDF).

10. The cellular base station of claim 9, wherein the cellular base station is further configured to:
determine that a first downlink packet of the first QoS Flow is not successfully transmitted;
determine that a second downlink packet of the first QoS Flow is dependent on the first downlink packet of the first QoS Flow; and drop the second downlink packet of the first QOS Flow based at least in part on the second downlink packet of the first QoS Flow being dependent on the first downlink packet of the first QOS Flow.

11. The cellular base station of claim 10,
wherein the second downlink packet of the first QoS Flow is dropped at one of a packet data convergence protocol (PDCP) layer or a radio link control (RLC) layer of the cellular base station, wherein the cellular base station is further configured to:
provide an indication to the wireless device that the second downlink packet of the first QoS Flow is dropped at one of the PDCP layer or the RLC layer of the cellular base station.

12. The cellular base station of claim 10,
wherein determining that the second downlink packet of the first QoS Flow is dependent on the first downlink packet of the first QoS Flow is based on header information included in the first downlink packet of the first QoS Flow and the second downlink packet of the first QoS Flow.

13. The cellular base station of claim 9, wherein the cellular base station is further configured to:
receive an indication of one or packet sequence numbers that are not transmitted to the cellular base station by the wireless device at a packet data convergence protocol (PDCP) layer or a radio link control (RLC) layer of the cellular base station.

14. A method, comprising:
establish a service data flow (SDF) with an application function (AF) via a cellular network;
determine that the SDF includes at least two categories of data, wherein a first category of data for the SDF has different Quality of Service (QOS) parameters than a second category of data for the SDF;
identifying a relationship between a first QoS Flow associated with a first QoS flow indicator (QFI) and a second QoS Flow associated with a second QFI based on parsing of uplink or downlink packets, wherein the relationship comprises the first QoS Flow depending on the second QoS Flow;
indicating the relationship to the cellular network using a protocol data unit (PDU) session modification request;
receiving, from the cellular network, a PDU session modification command responsive to the PDU session modification request;
communicate the first category of data for the SDF using the first QoS Flow; and
communicate the second category of data for the SDF using the second QoS Flow,
wherein the first category of data for the SDF and the second category of data for the SDF are communicated using the first QoS Flow and the second QoS Flow based at least in part on determining that the first category of data for the SDF has different QOS parameters than the second category of data for the SDF, and wherein scheduling of the first QoS Flow and the second QoS Flow is based at least in part on the relationship between them, wherein packets of the first QoS Flow and the second QoS flow are scheduled together.

15. The method of claim 14, further comprising:
parse packets of the SDF according to a packet filter to determine whether the packets of the SDF are associated with the first category of data for the SDF or the second category of data for the SDF.

16. The method of claim 15,
wherein the packet filter determines whether the packets of the SDF are associated with the first category of data for the SDF or the second category of data for the SDF based on one or more of:
Internet Protocol (IP) header information indicating Traffic Class or Type of Service (ToS);
IPv6 Flow Type information;
IP Security (IPSec) header Security parameters index information; or an offset value indicating a location of category information in packets of the SDF.

17. The method of claim 14, further comprising:
determine that a first uplink packet of the first QoS Flow is not successfully transmitted at a packet data convergence protocol (PDCP) layer of a wireless device;
determine that a second uplink packet of the first QoS Flow is dependent on the first uplink packet of the first QoS Flow; and
drop the second uplink packet of the first QOS Flow at the PDCP layer of the wireless device based at least in part on the second uplink packet of the first QoS Flow being dependent on the first uplink packet of the first QoS Flow.

18. The method of claim 17,
wherein determining that the second uplink packet of the first QoS Flow is dependent on the first uplink packet of the first QoS Flow is based on packet descriptor information included in the first uplink packet of the first QoS Flow and the second uplink packet of the first QOS Flow.

19. The method of claim 17, wherein based at least in part on the second uplink packet of the first QoS Flow being dropped at the PDCP layer of the wireless device, the method further comprises perform one or more of:
providing an indication that the second uplink packet of the first QoS Flow is dropped at the PDCP layer of the wireless device to the cellular network;
re-numbering PDCP sequence numbers (SNs) at the PDCP layer of the wireless device; or
creating a dummy PDCP packet with a PDCP SN corresponding to a PDCP SN of the second uplink packet of the first QoS Flow at the PDCP layer of the wireless device.

20. The method of claim 14, further comprising:
determine that a first uplink packet of the first QoS Flow is not successfully transmitted at a radio link control (RLC) layer of a wireless device;
determine that a second uplink packet of the first QoS Flow is dependent on the first uplink packet of the first QoS Flow;
drop the second uplink packet of the first QOS Flow at the RLC layer of the wireless device based at least in part on the second uplink packet of the first QoS Flow being dependent on the first uplink packet of the first QoS Flow; and
provide an indication that the second uplink packet of the first QoS Flow is dropped at the RLC layer of the wireless device to the cellular network.

\* \* \* \* \*